Nov. 12, 1968   E. H. SOUTER   3,410,951
SPLICING UNITS FOR COLD-FLOW SPLICES
Original Filed May 13, 1965   2 Sheets-Sheet 2

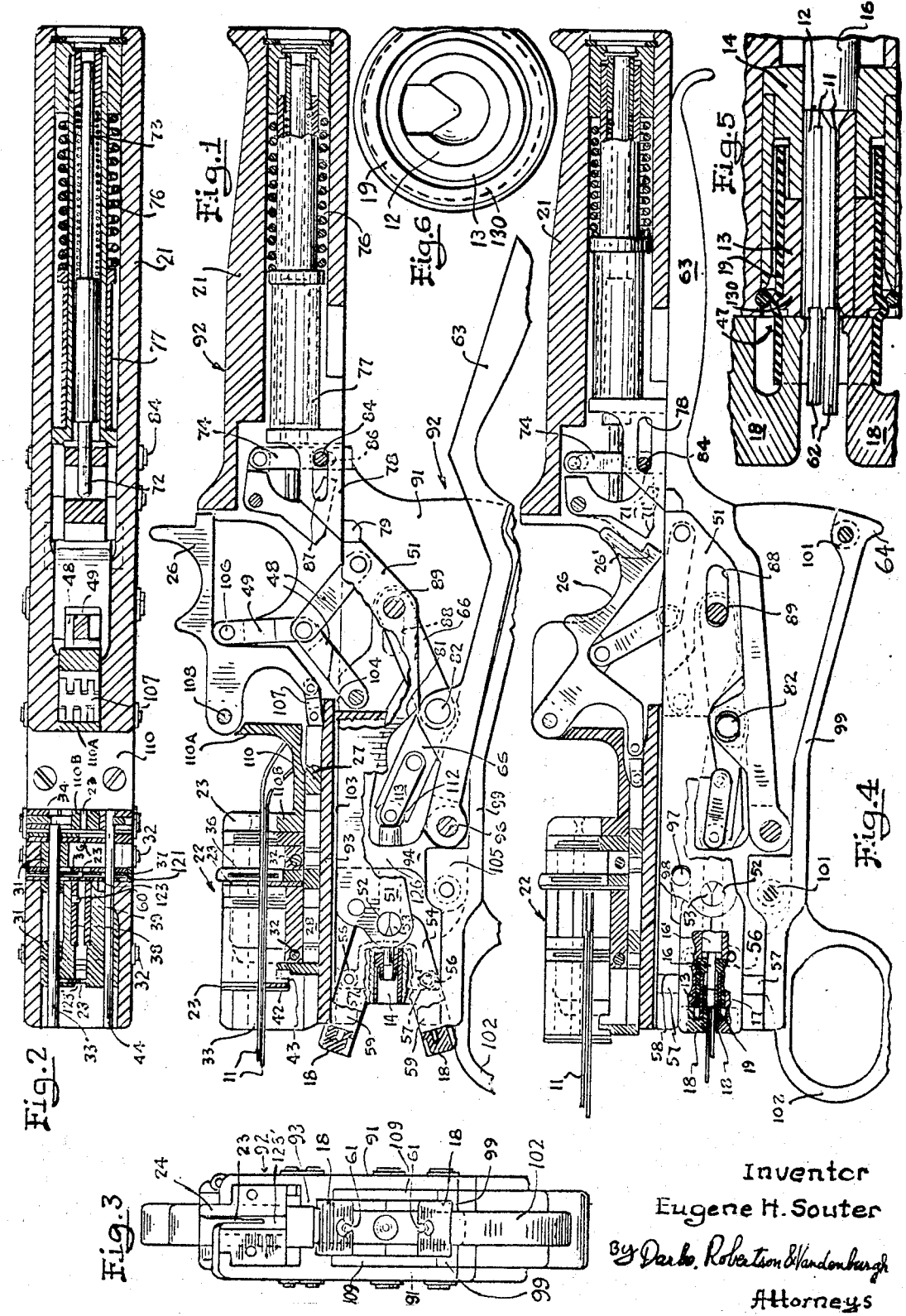

Inventor
Eugene H. Souter
By Darbo, Robertson & Vandenburgh
Attorneys

United States Patent Office 3,410,951
Patented Nov. 12, 1968

3,410,951
SPLICING UNITS FOR COLD-FLOW SPLICES
Eugene H. Souter, 721 Simpson St.,
Evanston, Ill. 60201
Original application May 13, 1965, Ser. No. 455,544.
Divided and this application Dec. 12, 1966, Ser. No. 600,798
7 Claims. (Cl. 174—84)

ABSTRACT OF THE DISCLOSURE

The splicing unit, to which this divisional application is directed, is used with a hand tool, also disclosed, for forming dependable splices, substantially of zero resistance, as in the wires of telephone cables. The two wires to be spliced are laid in a stripper and cutter portion. Upon operation of a thumb lever the wires are cut to even lengths and the insulation stripped from the portions to be spliced. These portions are fed end-first into the splicing unit previously inserted in the tool. This splicing unit includes a copper pin or core having a groove along its side into which the wires are fed axially. The pin is made to cold-flow around the wire by a plunger which moves lengthwise of the pin while the pin is confined. The pin is preferably confined within a small copper sleeve which is surrounded by an insulating rod. Numerous other features within this framework are disclosed.

Introduction

This application is a division of Ser. No. 455,544, filed May 13, 1965, Patent No. 3,350,761, and is directed to the splicing unit which may be used with the tool of that patent, and to the resulting spliced electrical connection.

This application relates to the making of permanent wire connections without solder and is especially suitable for telephone cable conductors. This disclosure is offered for public dissemination in the event of the grant of adequate patent protection.

The problem of splicing telephone cables has long been of tremendous and increasing economic and technical importance due to increased labor costs and more critical requirements of modern telephone circuitry. At the end of every length of cable, every wire in the cable (often thousands of pairs) must be spliced to a wire in the next length of cable, the splice must be insulated from other splices, and the entire bundle of splices must be sealed in a waterproof sheathing. For many years, there were two standard methods of splicing. One was to twist the stripped ends of the two or more wires to be joined and solder the twisted splice. Such splices, due to soldering variables, do not always provide minimum resistance for the desired period of time, but since this have proved to be the most dependable method of splicing, its use has been employed in joining all long distance and certain other most critical cable conductors.

Because of the high cost of making such splices the conductors in subscriber telephone circiuts are made without soldering but, usually, by simply twisting the wires together. In recent years, a great deal of time and money has been expended in an effort to deevlop a mechanically produced splice as reliable as the soldered splice but at a cost less than that of a simple twisted splice. At least one such splice was widely proclaimed as solving the problem only to be given up because a high percentage of splices so produced proved to be "open," or to have too high resistance either at the time they were made or soon thereafter. Another mechanically made splice is being used to a limited extent at the present time, but it is more expensive than even the soldered splice, and, in addition, its continued reliability is questionable. Furthermore, it is relatively bulky, so that when the necessary thousands of splices at a cable splicing location have been made, the necessary sleeve for enclosing them is objectionably large, resulting in high labor and materials costs, and greater space requirements.

According to the present invention, splicing units are provided for splices formed by an upsetting or cold-flowing operation which virtually coins together the splicing metal and the wires, the result being that splices thus produced are at least equal to the best soldered connections for all conditions and superior as to some. A tool for making such splices shown in the drawings here (the subject of Patent No. 3,350,761) is provided which enables an unskilled worker to make these splices with greater dependability than even a skilled worker could achieve making soldered splices. The preferred form of the tool also cuts and strips the wires to be joined. The tool is small, light weight and easily handled. FIGURES 1, 2, 3 and 4 are actual size, as filed, four-fifths size as printed in the patent.

Additional objects and advantages of the invention will be apparent from the following description and from the drawings.

Designation of figures

FIGURE 1 is a longitudinal sectional view of the splicing tool chosen for illustration, some parts being broken away for clarity.

FIGURE 2 is a longitudinal sectional view taken approximately at right angles to FIGURE 1, showing especially the wire shearing and stripping mechanism and the spring mechanism.

FIGURE 3 is an end view of the structure shown in FIGURE 1.

FIGURE 4 is a view similar to FIGURE 1 but showing the tool in its fully actuated position with a completed splice therein.

FIGURE 5 is an enlarged view showing the wires inserted into the splicing core before the upsetting operation.

FIGURE 6 is an end view of the splicing sleeve and core.

Figure 7:
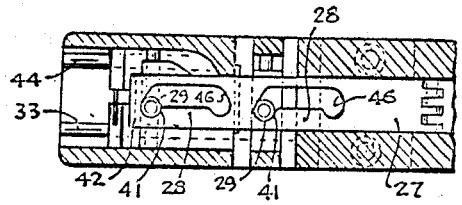
FIGURES 7 and 7A are sectional views of the wire clipper and stripper, looking upwardly at the cam, and respectively showing starting and final actuated positions.
Figure 7A:
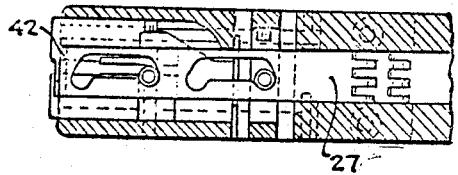

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concept are found.

General description of splice

According to the present invention the splice is made (see FIGURE 5) by inserting the stripped ends of the wires 11 to be joined into a slotted core 12 of annealed copper, which is surrounded by a sleeve 13, and upsetting the core 12 by the thrust of a plunger 16. This causes a cold flow of the metal of core 12 around the wires 11 into one intimate "coined" splice 17 seen at approximately its actual size in FIGURE 4. Jaws 18 bear on the ends of core 12 and sleeve 13 to withstand the thrust of plunger 16.

*General description of splicing unit, the tool and its operation*

In using the tool it will usually be held in one hand, perhaps continuously (the right hand if the operator is right-handed). First the splicing assembly or unit 47 to which this divisional application is directed will be inserted. In the form of invention shown in FIGS. 1 to 10 this, as seen best in FIG. 5, includes a core 12, sleeve 13 which may be called a die sleeve, and surrounding insulating sleeve or pod 19. This unit will be inserted into the die or fabricating cavity seen in FIG. 1. Then the two or three wires to be joined will be held side by side extending from the hand not holding the tool and slipped downwardly in guide slots 23. Then lever 26 is operated by the thumb of the hand holding the tool. This moves various parts to shear the wires to proper length and suitably strip insulation from the ends of sheared wires and close jaws 18. The completion of the stroke of thumb lever 26 releases these wires; and the operator, who will not have released them from his hand, removes them from the shear strip assembly and inserts their stripped ends end-first through jaws 18 which guide them into core 12. Now the operator squeezes hand or grip lever 63 and forces plunger 16 to its fully actuated position finishing with intense p.s.i. of force to thereby coin or cold-flow core 12 around the wires and form a coined splice of permanent lowest possible resistance. The confined cold flow apparently ensures either clean metal contact with the wires or such a large area of intimate and nearly clean contact as to be the equivalent. The pressure stretches sleeve 13, which probably remains in an elastically stretched condition resulting from its action in confining the core during cold flowing.

*Reference to patent for description of shearing and stripping*

Although most of the drawings of the parent application (Patent No. 3,350,761) are substantially duplicated herein, some of the description, especially of the shearing and stripping unit and of splice details, is omitted. It may be found in Patent No. 3,350,761.

*More specific description of splicing tool and operation*

At the same time that the thumb lever 26 was operating the stripper unit, it also actuated toggle links 48 by means of connecting or toggle-thrust link 49, to move rearwardly a pair of jaw closing slides 51. FIGURE 1 shows the starting position of toggle links 48 and slides 51 (with the near slide 51 partly broken away) and FIGURE 4 shows the terminal position of these parts. Each of slides 51 has at its forward end a hole 52. These holes engage segmental lugs 53 on jaw forks 54, so that when slide 51 is drawn rearwardly the jaw forks 54 are also drawn rearwardly. Each jaw fork 54 carries on each leg a jaw-closing roller 56 mounted on a pintle permanently fixed in jaw fork 54. As seen in FIGURE 1 and more clearly in FIGURE 11 the rollers 56 are initially in vertical slots 57 (in opposite faces of the front end of center frame 94), these slots are seen partially in full lines in FIGURE 4. During the initial rearward movement of the jaw levers or forks 54, slot walls 58 act as cams bearing on rollers 56, and moving these rollers toward one another to close the forks 54 thus closing the jaws 18 together. The subsequent rearward movement of the slides 51 will draw the jaws 18 rearwardly so that the inward and concentric projections on the jaws will slip inside insulation pod 19 and into engagement with core 12 and sleeve 13, which assembly was previously inserted as seen in FIG. 5. As jaws 18 are drawn rearwardly, they are pulled between shoulders or nose pieces 59 forming the end of center frame 94. This locks the jaws 18 in very close relationship for withstanding the great expansive force exerted by the metal which tends to flow between them during the cold flowing operation.

It is at this stage in the operation of the splicer that the grippers 38 and 39 are separated, releasing the wires; and the operator immediately inserts them through the axial guide opening formed by jaws 18 (the two halves 61 of this opening being seen in FIGURE 3). The operator thrusts the wires "home," which could be when their ends strike plunger 16, but has been shown (FIG. 5) as when the insulation 62 on the wires strikes core 12. Preferably provision is made for positive visual inspection, by placing kinks in the wires at such a position that they will lie flush with face of jaws 18 if the wires are "home." These kinks are made by vertical metal rib 60 projecting through the face of clamp 38, acting to depress the resilient face in clamp 39.

Up to this time the operator will have avoided pressing grip lever 63, as by keeping his index finger in front of lug 64. The operator now squeezes lever 63, perhaps first shifting his operating hand to the rearmost position on the tool. He moves grip lever 63 from the position shown in FIGURE 1 to the position shown in FIGURE 4. This operates toggle links 66 to thrust plunger 16, 16' forwardly, coining core 12 about wires 11 by cold-flow of the metal as previously described. The progressively increasing mechanical advantage such as that of a toggle linkage is very important in obtaining the needed ultimate force without too long a stroke for grip operation.

*Abortion prevention*

To ensure 100% dependable splices, it is important that hand lever 63 be operated through its entire stroke. To this end the tool is so made that the splice cannot be removed until this has been accomplished.

As thumb lever 26 reaches the end of its movement, at which time slide 51 and jaws 18 reach their rearmost position, latch lever 71 springs from the full line position shown in FIGURE 4 to the dotted line position shown in FIGURE 4, in which the latch edge 71' locks a lug 26' on thumb lever 26. Latch lever 71 is urged to this position by pin 72 which in turn is biased by spring 73, the inner of two springs within main handle 21. This locks the jaws 18 in the position shown in FIGURE 4 until latch 71 is released. Latch 71 is not released, however, until hand lever 63, at the end of its stroke, thrusts release link 74 upwardly. By virtue of the fact that link 74 is pivoted to a rearward arm of a bell crank lever 71, this swings latch 71' back to the full line position of FIGURE 4, releasing thumb lever 26 and allowing it to return to its starting position shown in FIGURE 1.

At this time, all parts are moved to their starting or FIGURE 1 position by return spring 76 located within handle 21. Return spring 76 thrusts sleeve 77 forwardly and it in turn thrusts forwardly pusher foot 78, the toes 79 of which thrust slides 51 forwardly, returning jaws 18 to their FIG. 1 position. Slides 51 have a cam surface 81 positioned to bear upon an upward projection of hand lever 63 and force toggle pin 82 downwardly thereby restoring lever 63 and associated toggles 66 to the FIGURE 1 position and retracting plunger 16, 16'. Thus the splicing tool is ready for reloading and for a new splicing operation.

*Further details of splice unit*

The splice unit shown in FIG. 5 is believed to be sufficiently clear from that figure and FIG. 6. Axial rib 130, which may be formed by swedging axially, prevents inserting the splicing assembly wrong end first and holds the sleeve 13 from sliding lengthwise in pod 19. A later form, now preferred, is shown in FIG. 11 and described below.

Preferred symmetrical splicing unit

Figure 11:
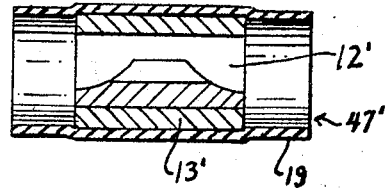
FIGURE 11 is an enlarged axial sectional view showing a form of splicing core-sleeve-pod assembly now preferred.
Figure 8:
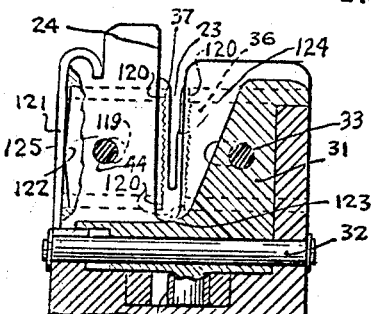
FIGURE 8 is a fragmentary sectional view taken through the shuttle carriage of the shearer and stripper, looking through one of the insertion guides toward the stripper assembly and the forward insertion guide.
Figure 9:
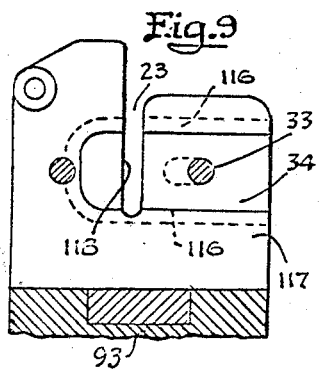
FIGURE 9 is a similar view showing the face of the clipper assembly.
Figure 10:
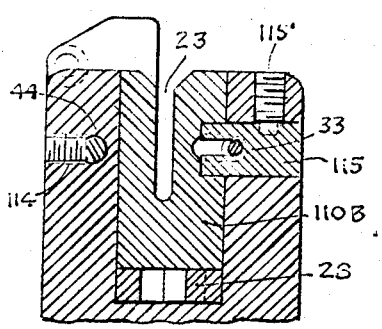
FIGURE 10 is a similar view showing another insertion guide and the locking means for the slide rods.

FIG. 11 shows the form of splicing now preferred. Its differences, and reasons for their preference are:

(1) It is symmetrical end-for end. The time for chucking assembly 47' greatly is reduced. Since both ends of assembly 47' are identical either one may be entered first into the chucking cavity to thus obviate the necessity of tedious and time consuming orientation before insertion by operator.

(2) The core 12' is of the same length as sleeve 13. Because it does not project beyond the rear end of sleeve 13, there is no necessity for operator to center it with, and push it into ram guide as shown in FIG. 5.

(3) The core is shorter and has less air space within it. Hence, less work in grapping by the hand (fewer foot-pounds) is required to cold flow and coin core 12'. This is true because when the void created by the wire received slot is reduced, the ram travel required to fill the slot is relatively reduced.

(4) Core 12' is shaped at both ends as by milling to deepen or provide a "lead" to the wire receiving groove to be sure the wires when guided by the jaws 18' will slip easily into the groove. The guide aperture of jaws 18' is round and concentric with the axis of the splicing unit. Hence, the splicing unit may be inserted without paying any attention to the angular disposition of the groove in core 12' about the axis. Also, manufacturing cost is low. It is expected that long, continuously fabricated lengths of grooved copper wire (the grooves perhaps being rolled or milled) will be milled one core length rearwardly from the end for deepening beyond the groove, and then sawed or cut in the middle of the milled area, thus forming the milled and completed rear end of one core and leaving a milled and completed front end of the next core.

(5) Sleeve 13' is merely square cut, and hence can be sawed at very low cost from copper tubing. The pod 19 is slightly undersize, compared to the diameter of sleeve 13' so that its stretched condition holds it safely on the sleeve 13', without forming any flange or rib 130 on the sleeve, such as that shown in FIG. 5.

The spacing between the shearing and stripping units should be reduced almost to the length of core 12' so that no stripped wire will extend close to the end of pod 19.

Accomplishment

Splices made according to the present invention, having been subjected to Dry Ice and then heated to cherry red, have been found to still have substantially "0" splice resistance. Using a measuring technique that can measure to a 1/100,000 of an ohm, insignificant variations can be detected between samples. However, differences between two spliced wires and equivalent lengths of wires without a splice appear to be due to diameter variations within commercial tolerance of the wires themselves, rather than to any detectable splice resistance.

With the tool of this invention such high quality splices can be made dependably and rapidly without power (except hand power) or heat, and without requiring the skill necessary for soldering with hope of dependablity. Also, much less cost for splicing units and less room for the finished splice is required than by the mechanical splicing used or tried to some extent on telephone cables in the last few years. Also, splicing according to the present invention is much less costly than conventional twisting, or twisting and soldering. In all, a great deal of money can be saved by telephone companies, with complete dependability of the splices.

The excellent results indicated have so far been obtained only with splicing units approximately of the form shown in FIG. 5. The preference for the form shown in FIG. 14 is therefore dependent upon tests confirming the belief that it will produce splices which can be shown by test to be just as good, or at least substantially so and safely satisfactory.

I claim:

1. A cold-flow splicing unit including a sturdy die sleeve and a malleable, low resistance metal core within the sleeve having butt ends at opposite ends thereof and having a single passage therein for receiving wires to be spliced, said passage being a slot extending longitudinally the length of the core, opening along one side of the core and extending a little past the axis of the core, said core being soft enough to cold-flow under influence of force applied directly to the core while being restrained by the die sleeve.

2. A cold-flow splicing unit including a sturdy die sleeve and a malleable, low resistance metal core within the sleeve having butt ends at opposite ends thereof and having a single passage therein for receiving wires to be spliced, said passage being a slot extending longitudinally the length of the core, opening along one side of the core and extending a little past the axis of the core, said core being soft enough to cold-flow under influence of force applied directly to the core while being restrained by the die sleeve, and an insulating pod enclosing and extending beyond the sleeve, in both axial directions.

3. A cold-flow splicing unit including a sturdy die sleeve and a malleable, low resistance metal core within the sleeve having butt ends at opposite ends thereof and having a single passage therein for receiving wires to be spliced, said passage being a slot extending longitudinally the length of the core, opening along one side of the core and extending a little past the axis of the core, said core being soft enough to cold-flow under influence of force applied directly to the core while being restrained by the die sleeve, and an insulating pod enclosing and extending beyond the sleeve in both axial directions, said splicing unit being symmetrical to permit its insertion either end first into a splicing tool.

4. A cold-flow splicing unit including a sturdy die sleeve and a malleable, low resistance metal core within the sleeve having butt ends at opposite ends thereof and having a single passage therein for receiving wires to be spliced, said passage being a slot extending longitudinally the length of the core, opening along one side of the core and extending a little past the axis of the core, said core being soft enough to cold-flow under influence of force applied directly to the core while being restrained by the die sleeve, and in which the unit is symmetrical to permit its insertion either end first into a splicing tool.

5. A cold-flow splicing unit including a sturdy die sleeve and a malleable, low resistance metal core within the sleeve having butt ends at opposite ends thereof and having a single passage therein for receiving wires to be spliced, said passage being a slot extending longitudinally the length of the core, opening along one side of the core and extending a little past the axis of the core, said core being soft enough to cold-flow under influence of force applied directly to the core while being restrained by the die sleeve, and in which the passage in the core is enlarged at its end with a tapering shape guiding wires into it when thrust endwise axially of the unit and near its axis.

6. A cold-flow splicing unit including a sturdy die sleeve and a malleable, low resistance metal core within the sleeve having butt ends at opposite ends thereof and having a single passage therein for receiving wires to be spliced, said passage being a slot extending longitudinally the length of the core, opening along one side of the core and extending a little past the axis of the core, said core being soft enough to cold-flow under influence of force applied directly to the core while being restrained by the die sleeve, and in which the passage is enlarged at its ends with a tapering shape guiding wires into it when thrust endwise axially of the unit and near its axis, the unit being symmetrical to permit its insertion either end first into a splicing tool.

7. A spliced electrical connection including wires having bare end portions embedded in a core within a sturdy die sleeve surrounded by an insulating pod;

said core being in the cold-flowed state of axial compactness, intimately contacting and surrounding the bare wire portions, and pressing against the die sleeve throughout its periphery, corresponding to having been subjected in situ, with the wires extending axially through a longitudinal slot therein opening along one side of the core, to compressive force applied directly to the core sufficient to cause cold flowing of the core while restrained peripherally by the die sleeve.

References Cited

UNITED STATES PATENTS

| | | |
|---|---|---|
| 1,575,656 | 3/1926 | Stratford et al. _____ 174—84 |
| 2,252,448 | 8/1941 | Van Nest. |
| 2,296,443 | 9/1942 | Kleinfelder. |
| 2,314,884 | 3/1943 | Klein _____ 174—84 |
| 2,478,082 | 8/1949 | Broske _____ 174—94 X |
| 2,583,625 | 1/1952 | Bergan _____ 29—517 |
| 2,603,680 | 7/1952 | Snyder. |
| 3,185,762 | 5/1965 | Shaw _____ 174—194 X |

CHARLIE T. MOON, *Primary Examiner*.